US010833332B2

(12) United States Patent
Stamenkovic et al.

(10) Patent No.: US 10,833,332 B2
(45) Date of Patent: Nov. 10, 2020

(54) SYSTEMS AND METHODS FOR SCALE-UP SYNTHESIS MULTI-LAYERED PT-SKIN NANOPARTICLE CATALYSTS

(71) Applicant: UCHICAGO ARGONNE LLC, Chicago, IL (US)

(72) Inventors: Vojislav Stamenkovic, Naperville, IL (US); Gregory K. Krumdick, Homer Glen, IL (US); Rongyue Wang, Westmont, IL (US); Nenad Markovic, Hinsdale, IL (US); Krzysztof Z. Pupek, Plainfield, IL (US)

(73) Assignee: UChicago Argonne, LLC, Chicago, IL (US)

( * ) Notice: Subject to any disclaimer, the term of this patent is extended or adjusted under 35 U.S.C. 154(b) by 76 days.

(21) Appl. No.: 15/996,297

(22) Filed: Jun. 1, 2018

(65) Prior Publication Data
US 2019/0372128 A1    Dec. 5, 2019

(51) Int. Cl.
*H01M 4/86* (2006.01)
*H01M 4/92* (2006.01)

(52) U.S. Cl.
CPC ......... *H01M 4/8657* (2013.01); *H01M 4/921* (2013.01); *H01M 4/926* (2013.01)

(58) Field of Classification Search
CPC .... H01M 4/8657; H01M 4/921; H01M 4/926; B01J 35/008; B01J 23/892
See application file for complete search history.

(56) References Cited

U.S. PATENT DOCUMENTS

| 5,879,827 | A | 3/1999 | Debe et al. |
| 7,252,698 | B2 | 8/2007 | Mirkin et al. |
| 7,622,217 | B2 | 11/2009 | Debe et al. |
| 7,871,738 | B2 | 1/2011 | Stamenkovic et al. |
| 8,178,463 | B2 | 5/2012 | Stamenkovic et al. |
| 8,685,878 | B2 | 4/2014 | Stamenkovic et al. |
| 9,246,177 | B2 | 1/2016 | Stamenkovic et al. |
| 9,735,432 | B2 * | 8/2017 | Cho ................ B01J 37/16 |
| 10,099,207 | B2 * | 10/2018 | Stamenkovic ........ B01J 23/892 |
| 2002/0194958 | A1 * | 12/2002 | Lee ........................ B82Y 30/00 75/370 |
| 2004/0072061 | A1 | 4/2004 | Nakano et al. |
| 2006/0083970 | A1 | 4/2006 | Shibutani et al. |
| 2009/0247400 | A1 | 10/2009 | Stamenkovic et al. |
| 2010/0008840 | A1 * | 1/2010 | Zhong .................. B01D 53/864 423/247 |
| 2010/0086832 | A1 | 4/2010 | Lopez et al. |
| 2010/0092841 | A1 | 4/2010 | Lopez et al. |

(Continued)

FOREIGN PATENT DOCUMENTS

WO   WO-2011/139705 A1   11/2011

OTHER PUBLICATIONS

Carey (Dichorobenzene, Britannica Online Encyclopedia, 2008).*
(Continued)

*Primary Examiner* — Jun Li
(74) *Attorney, Agent, or Firm* — Foley & Lardner LLP

(57) ABSTRACT

A method for scaled-up synthesis of PtNi nanoparticles. Synthesizing a Pt nanoparticle catalyst comprises the steps of: synthesizing PtNi nanoparticles, isolating PtNi/substrate nanoparticles, acid leaching the PtNi/substrate, and annealing the leached PtNi/substrate nanoparticles, and forming a Pt-skin on the PtNi/substrate nanoparticles.

18 Claims, 15 Drawing Sheets

(56) References Cited

U.S. PATENT DOCUMENTS

| | | |
|---|---|---|
| 2010/0197490 A1 | 8/2010 | Adzic et al. |
| 2011/0077147 A1 | 3/2011 | Stamenkovic et al. |
| 2011/0159365 A1 | 6/2011 | Loveness et al. |
| 2011/0167962 A1* | 7/2011 | Ghanavi ............... B82Y 30/00 75/370 |
| 2011/0189589 A1 | 8/2011 | Erlebacher et al. |
| 2013/0053239 A1* | 2/2013 | Carpenter ............ H01M 4/921 502/326 |
| 2013/0085061 A1 | 4/2013 | Stamenkovic et al. |
| 2013/0133483 A1* | 5/2013 | Yang .................... B22F 1/0018 75/351 |
| 2013/0178357 A1* | 7/2013 | Adzic ................. H01M 4/9041 502/5 |
| 2015/0017570 A1* | 1/2015 | Yang .................... B22F 1/0085 429/523 |
| 2015/0132683 A1 | 5/2015 | Shirvanian |
| 2015/0236355 A1 | 8/2015 | Yang et al. |
| 2016/0233516 A1 | 8/2016 | Nakamura et al. |

OTHER PUBLICATIONS

"A matter of scale," Nature Nanotechnology 11, p. 773 (2016).
Banham & Ye, "Current Status and Future Development of Catalyst Materials and Catalyst Layers for Proton Exchange Membrane Fuel Cells: An Industrial Perspective," ACS Energy Letters 2(3), pp. 629-638 (2017).
Chen, et al., "Highly Crystalline Multimetallic Nanoframes with Three-Dimensional Electrocatalytic Surfaces," Science 343(6177), pp. 1339-1343 (2014).
Choi, et al., "Gram-scale synthesis of highly active and durable octahedral PtNi nanoparticle catalysts for proton exchange membrane fuel cell," Applied Catalysis B: Environmental 225, pp. 530-537 (2018).
Cui, et al., "Compositional segregation in shaped Pt alloy nanoparticles and their structural behavior during electrocatalysis," Nature Materials 12, pp. 765-771 (2013).
Debe, "Electrocatalyst approaches and challenges for automotive fuel cells," Nature 486, pp. 43-51 (2012).
Dubau, et al., "Tuning the Performance and the Stability of Porous Hollow PtNi/C Nanostructures for the Oxygen Reduction Reaction," ACS Catalysis 5(9), pp. 5333-5341 (2015).
Fu, et al., "Three-dimensional PtNi hollow nanochains as an enhanced electrocatalyst for the oxygen reduction reaction," Journal of Materials Chemistry A 4, pp. 8755-8761 (2016).
Gasteiger, et al., "Activity benchmarks and requirements for Pt, Pt-alloy, and non-Pt oxygen reduction catalysts for PEMFCs," Applied Catalysis B: Environmental 56(1-2), pp. 9-35 (2005).
Han, et al., "Record activity and stability of dealloyed bimetallic catalysts for proton exchange membrane fuel cells," Energy & Environmental Science 8, pp. 258-266 (2015).
Koh & Strasser, "Electrocatalysis on Bimetallic Surfaces:? Modifying Catalytic Reactivity for Oxygen Reduction by Voltammetric Surface Dealloying," Journal of the American Chemical Society 129(42), pp. 12624-12625 (2007).
Li, et al., "Surfactant Removal for Colloidal Nanoparticles from Solution Synthesis: The Effect on Catalytic Performance," ACS Catalysis 2(7), pp. 1358-1362 (2012).
Lohse, et al., "A Simple Millifluidic Benchtop Reactor System for the High-Throughput Synthesis and Functionalization of Gold Nanoparticles with Different Sizes and Shapes," ACS Nano 7(5), pp. 4135-4150 (2013).
Lopes, et al., "Relationships between Atomic Level Surface Structure and Stability/Activity of Platinum Surface Atoms in Aqueous Environments," ACS Catalysis, 2016, 6(4), pp. 2536-2544.
Niu & Li, "Removal and Utilization of Capping Agents in Nanocatalysis," Chemistry of Materials 26(1), pp. 72-83 (2014).
Niu, et al., "Toward continuous and scalable production of colloidal nanocrystals by switching from batch to droplet reactors," Chemical Society Reviews 44, pp. 5806-5820 (2015).

Shao, et al., "Recent Advances in Electrocatalysts for Oxygen Reduction Reaction," Chemical Reviews 116(6), pp. 3594-3657 (2016).
Snyder, et al., "Structure/Processing/Properties Relationships in Nanoporous Nanoparticles As Applied to Catalysis of the Cathodic Oxygen Reduction Reaction," Journal of the American Chemical Society 134(20), pp. 8633-8645 (2012).
Stamenkovic, et al., "Improved Oxygen Reduction Activity on Pt3Ni(111) via Increased Surface Site Availability," Science 315(511), pp. 493-497 (2007).
Stamenkovic, et al., "Improved Oxygen Reduction Activity on Pt3Ni(111) via Increased Surface Site Availability," Science 315(5811), pp. 493-497 (2007).
Stephens, et al., "Toward sustainable fuel cells," Science 354(6318), pp. 1378-1379 (2016).
Strasser, "Catalysts by Platonic design," Science 349(6246), pp. 379-380 (2015).
Sun & Xia, "Shape-Controlled Synthesis of Gold and Silver Nanoparticles," Science 298(5601), pp. 2176-2179 (2002).
Sun, et al., "Template-Engaged Replacement Reaction: A One-Step Approach to the Large-Scale Synthesis of Metal Nanostructures with Hollow Interiors," Nano Letters 2(5), pp. 481-485 (2002).
Tsao & Yang, "Continuous Production of Carbon-Supported Cubic and Octahedral Platinum-Based Catalysts Using Conveyor Transport System," Small 12(35), pp. 4808-4814 (2016).
Xia, et al,. "Shape-Controlled Synthesis of Metal Nanocrystals: Simple Chemistry Meets Complex Physics," Angewandte Chemie 48(1), pp. 60-103 (2008).
Zhang & Xia, "Scaling up the Production of Colloidal Nanocrystals: Should We Increase or Decrease the Reaction Volume?," Advanced Materials 26(16), pp. 2600-2606 (2014).
Zhang, et al., "A Generic Wet Impregnation Method for Preparing Substrate-Supported Platinum Group Metal and Alloy Nanoparticles with Controlled Particle Morphology," Nano Letters 16(1), pp. 164-169 (2016).
Zhang, et al., "Platinum-based nanocages with subnanometer-thick walls and well-defined, controllable facets," Science 349(6246), pp. 412-416 (2016).
Zhang, et al., "Solid-State Chemistry-Enabled Scalable Production of Octahedral Pt—Ni Alloy Electrocatalyst for Oxygen Reduction Reaction," Journal of the American Chemical Society 136(22), pp. 7805-7808 (2014).
Non-Final Office Action for U.S. Appl. No. 16/006,671 dated Jul. 9, 2019, 7 pages.
Stamenkovic, et al., "Effect of Surface Composition on Electronic Structure, Stability, and Electrocatalytic Properties of Pt-Transition Metal Alloys: Pt-Skin versus Pt-Skeleton Surfaces," Journal of the American Chemical Society 128(27), pp. 8813-8819 (2006).
Ahrenstorf, et al., "Colloidal Synthesis of NixPt1-x Nanoparticles with Tuneable Composition and Size," Small 3(2), pp. 271-274 (2007).
Armstrong, et al., "Evaluating the performance of nanostructured materials as lithium-ion battery electrodes," Nano Research 7(1), pp. 1-62 (2014).
Baskes & Johnson, "Modified embedded atom potentials for HCP metals," Modelling and Simulation in Materials Science and Engineering 2, pp. 147-163 (1994).
Baskes, "Modified embedded-atom potentials for cubic materials and impurities," Physical Review B 46(5), pp. 2727-2742 (1992).
Cargnello, et al., "Control of Metal Nanocrystal Size Reveals Metal-Support Interface Role for Ceria Catalysts," Science 341(6147), pp. 771-773 (2013).
Chadi & Cohen, "Special Points in the Brillouin Zone," Physical Review 8(12), pp. 5747-5753 (1973).
Dahmani, et al., "Ni—Pt Phase Diagram: Experiment and Theory," Physical Review Letters 55(11), pp. 1208-1211 (1985).
Davis, "Ordered porous materials for emerging applications," Nature 417, pp. 813-821 (2002).
Erlebacher, et al., "Evolution of nanoporosity in dealloying," Nature 410, pp. 450-453 (2001).

(56) References Cited

OTHER PUBLICATIONS

Ferreira, et al., "Instability of Pt?/?C Electrocatalysts in Proton Exchange Membrane Fuel Cells: A Mechanistic Investigation," Journal of the Electrochemical Society 152(11), pp. A2256-A2271 (2005).
Grass, et al., "New ambient pressure photoemission endstation at Advanced Light Source beamline 9.3.2," Review of Scientific Instruments 81, 053106, 7 pages (2010).
Hammer, et al., "Improved adsorption energetics within density-functional theory using revised Perdew-Burke-Ernzerhof functionals," Physical Review B 59(11), pp. 7413-7421 (1999).
Jaco & Goddard, "Adsorption of Atomic H and O on the (111) Surface of Pt3Ni Alloys," The Journal of Physical Chemistry B 108(24), pp. 8311-8323 (2004).
Johnson, et al., "Ordered Mesoporous Polymers of Tunable Pore Size from Colloidal Silica Templates," Science 283(5404), pp. 963-965 (1999).
Kang, et al., "Heterogeneous Catalysts Need Not Be so 'Heterogeneous': Monodisperse Pt Nanocrystals by Combining Shape-Controlled Synthesis and Purification by Colloidal Recrystallization," Journal of the American Chemical Society 135(7), pp. 2741-2747 (2013).
Kang, et al., "Shape-Controlled Synthesis of Pt Nanocrystals: The Role of Metal Carbonyls," ACS Nano 7(1), pp. 645-653 (2013).
Kirkland, et al., "Simulation of annular dark field stem images using a modified multislice method," Ultramicroscopy 23(1), pp. 77-96 (1987).
Klenov &Stemmer, "Contributions to the contrast in experimental high-angle annular dark-field images," Ultramicroscopy 106(10), pp. 889-901 (2006).
Liu, et al., "Self-Terminating Growth of Platinum Films by Electrochemical Deposition," Science 338(6112), pp. 1327-1330 (2012).
Liu, et al., "Synthesis and activation of Pt nanoparticles with controlled size for fuel cell electrocatalysts," Journal of Power Sources 164(2), pp. 472-480 (2007).
MacDonald, et al., "Hybrid Nanoscale Inorganic Cages," Nature Materials 9, pp. 810-815 (2010).
Mahmoud, et al., "Following Charge Separation on the Nanoscale in Cu2O—Au Nanoframe Hollow Nanoparticles," Nano Letters 11(8), pp. 3285-3289 (2011).
McEachran, et al., "Ultrathin Gold Nanoframes through Surfactant-Free Templating of Faceted Pentagonal Silver Nanoparticles," Journal of the American Chemical Society 133(21), pp. 8066-8069 (2011).
Nellist & Pennycook, "Incoherent imaging using dynamically scattered coherent electrons", Ultramicroscopy 78(1-4), pp. 111-124 (1999).
Niu, et al., "Synthesis of Pt—Ni Octahedra in Continuous-Flow Droplet Reactors for the Scalable Production of Highly Active Catalysts toward Oxygen Reduction," Nano Letters 16(6), pp. 3850-3857 (2015).
Oh, et al., "Galvanic Replacement Reactions in Metal Oxide Nanocrystals," Science 340(6135), pp. 964-968 (2013).
Oszajca, et al., "Precisely Engineered Colloidal Nanoparticles and Nanocrystals for Li-Ion and Na-Ion Batteries: Model Systems or Practical Solutions?," Chemistry of Materials 26(19), pp. 5422-5432 (2014).
Park & Xia, "Macroporous Membranes with Highly Ordered and Three-Dimensionally Interconnected Spherical Pores," Advanced Materials 10(13), pp. 1045-1048 (1998).
Perdew, et al., "Atoms, molecules, solids, and surfaces: Applications of the generalized gradient approximation for exchange and correlation," Physical Review B 46(11), pp. 6671-6687 (1992).
Pupek, "Continuous Flow Synthesis, a Platform to Accelerate the Transition of Nanomaterials to Manufacturing," Informatics, Electronics and Microsystems: TechConnect Briefs 2018, pp. 130-133 (2018).

Schlogl, et al., "Ambient Pressure Photoelectron Spectroscopy: A new tool for surface science and nanotechnology," Surface Science Reports 63(4), pp. 169-199 (2008).
Skrabalak, et al., "Gold Nanocages: Synthesis, Properties, and Applications," Accounts of Chemical Research 41(12), pp. 1587-1595 (2008).
Snyder, et al., "Oxygen reduction in nanoporous metal-ionic liquid composite electrocatalysts," Nature Materials 9, pp. 904-907 (2010).
Stamenkovic, et al., "Surface Composition Effects in Electrocatalysis: Kinetics of Oxygen Reduction on Well Defined Pt3Ni and Pt3Co Alloy Surfaces," Journal of Physical Chemistry B 106(46), pp. 11970-11979 (2002).
Subbaraman, et al., "Enhancing Hydrogen Evolution Activity in Water Splitting by Tailoring Li—Ni(OH)2-Pt Interfaces," Science 334(6060), pp. 1256-1260 (2011).
Tang, et al., "Electrochemical Stability of Nanometer-Scale Pt Particles in Acidic Environments," Journal of the American Chemical Society 132(2), pp. 596-600 (2010).
Tao, et al., "Reaction-Driven Restructuring of Rh—Pd and Pt—Pd Core-Shell Nanoparticles," Science 322(5903), pp. 939-934 (2008).
Van Der Vliet, et al., "Mesostructured thin films as electrocatalysts with tunable composition and surface morphology," Nature Materials 11, pp. 1051-1058 (2012).
Van Der Vliet, et al., "Unique Electrochemical Adsorption Properties of Pt-Skin Surfaces," Angewandte Chemie 124(13), pp. 3193-3196 (2012).
Vanderbilt, "Soft self-consistent pseudopotentials in a generalized eigenvalue formalism," Physical Review B 41(11), pp. 7892-7895 (1990).
Wang & Li, et al., "Effective Octadecylamine System for Nanocrystal Synthesis," Inorganic Chemistry 50(11), pp. 5196-5202 (2011).
Wang et al., "Monodisperse Pt3Co Nanoparticles as a Catalyst for the Oxygen Reduction Reaction: Size-Dependent Activity," The Journal of Physical Chemistry C 113(45), pp. 19365-19368 (2009).
Wang, et al., "Design and Synthesis of Bimetallic Electrocatalyst with Multilayered Pt-Skin Surfaces," Journal of the American Chemical Society 133(36), pp. 14396-14403 (2011).
Wang, et al., "Kirkendall Effect and Lattice Contraction in Nanocatalysts: A New Strategy to Enhance Sustainable Activity," Journal of the American Chemical Society 133(34), pp. 13551-13557 (2011).
Wang, et al., "One-Pot Solution Synthesis of Cubic Cobalt Nanoskeletons," Advanced Materials 21(16), pp. 1636-1640 (2009).
Wang, et al., "Phase and Interface Engineering of Platinum—Nickel Nanowires for Efficient Electrochemical Hydrogen Evolution," Angewandte Chemie 55(41), pp. 12859-12863 (2016).
Wang, et al., "Structurally ordered intermetallic platinum—cobalt core—shell nanoparticles with enhanced activity and stability as oxygen reduction electrocatalysts," Nature Materials 12, pp. 81-87 (2013).
Wu, et al., "Shape and Composition-Controlled Platinum Alloy Nanocrystals Using Carbon Monoxide as Reducing Agent," Nano Letters 11(2), pp. 798-802 (2011).
Wu, et al., "Syntheses of Water-Soluble Octahedral, Truncated Octahedral, and Cubic Pt—Ni Nanocrystals and Their Structure—Activity Study in Model Hydrogenation Reactions," Journal of the American Chemical Society 134(21), pp. 8975-8981 (2012).
Wu, et al., "Truncated Octahedral Pt3Ni Oxygen Reduction Reaction Electrocatalysts," Journal of the American Chemical Society 132(14), pp. 4984-4985 (2010).
Xin, et al., "Revealing the Atomic Restructuring of Pt—Co Nanoparticles," Nano Letters 14(6), pp. 3203-3207 (2014).
Yadavali, et al., "Silicon and glass very large scale microfluidic droplet integration for terascale generation of polymer microparticles," Nature Communications 9, 1222, 9 pages (2018).
Yavuz, et al., "Gold nanocages covered by smart polymers for controlled release with near-infrared light," Nature Materials 8, pp. 935-939 (2009).
Yin, et al., "Formation of Hollow Nanocrystals Through the Nanoscale Kirkendall Effect," Science 304(5671), pp. 711-714 (2004).
Zeng, et al., "A Comparison Study of the Catalytic Properties of Au-Based Nanocages, Nanoboxes, and Nanoparticles," Nano Letters 10(1), pp. 30-35 (2010).

(56) References Cited

OTHER PUBLICATIONS

Zhang, et al., "Synthesis and Oxygen Reduction Activity of Shape-Controlled Pt3Ni Nanopolyhedra," Nano Letters 10(2), pp. 638-644 (2010).

* cited by examiner

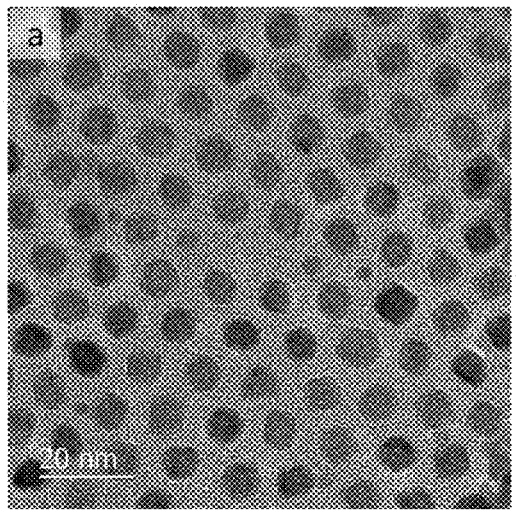
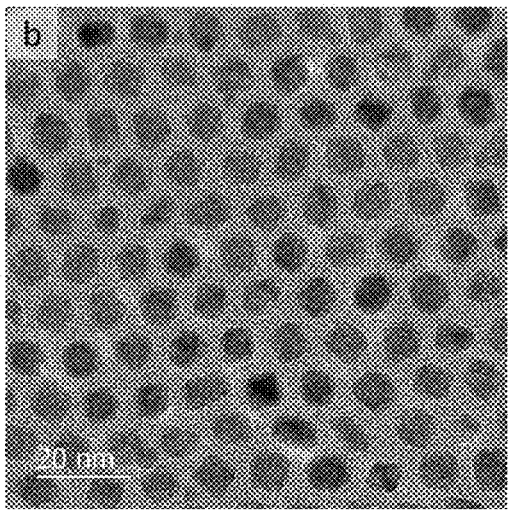
Fig. 2A                Fig. 2B
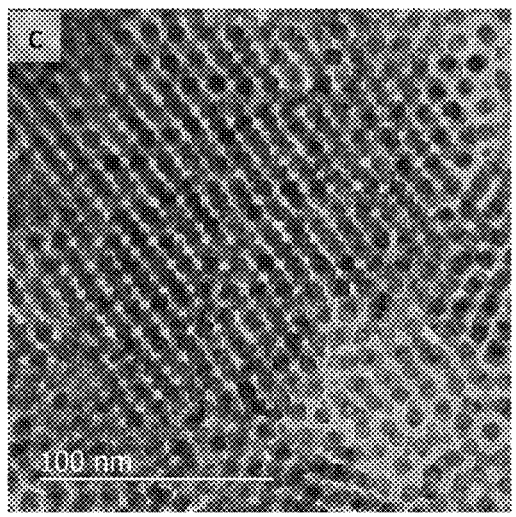
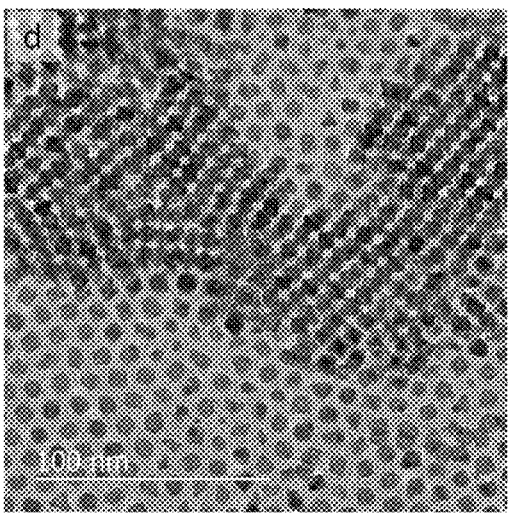
Fig. 2C                Fig. 2D

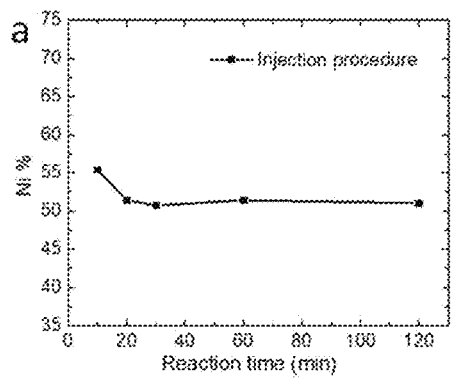 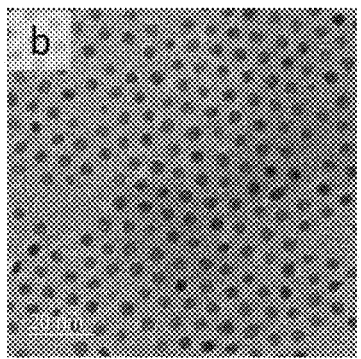 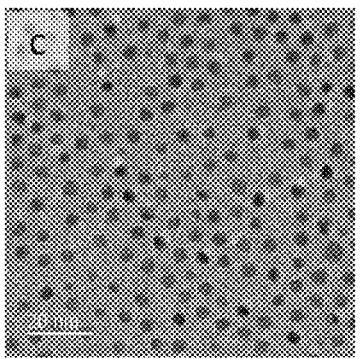
Fig. 6A	Fig. 6B	Fig. 6C
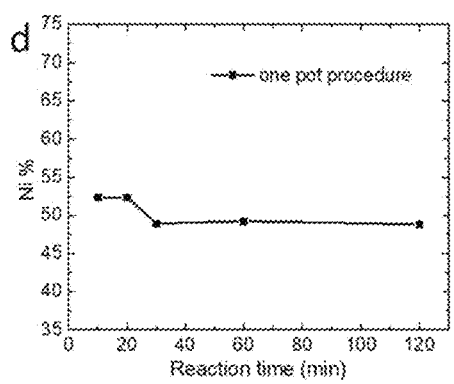 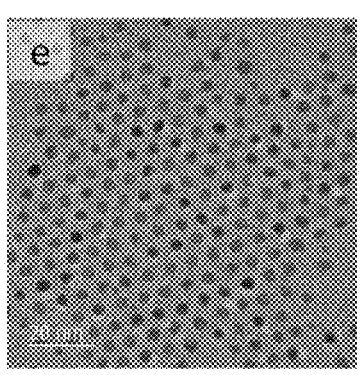 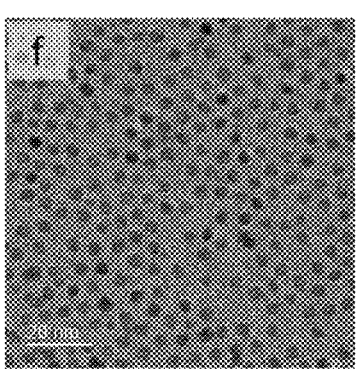
Fig. 6D	Fig. 6E	Fig. 6F
Fig. 7

| Diol | Ni | Pt | Particle size |
|---|---|---|---|
| Standard | ~50 | ~50 | ~4nm |
| ¾ of standard | 54 | 46 | ~4nm |
| ½ of standard | 34 | 66 | Close to 4nm |
| 0 | 28 | 72 | ~3 nm |

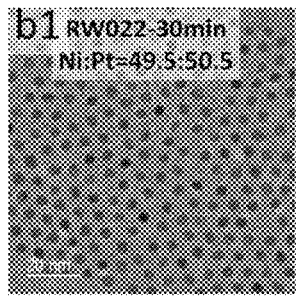 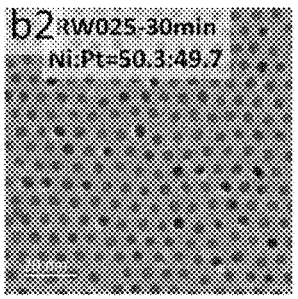 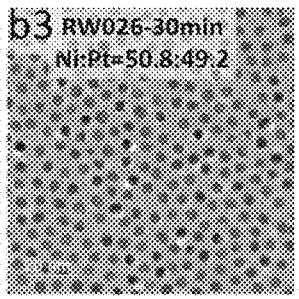 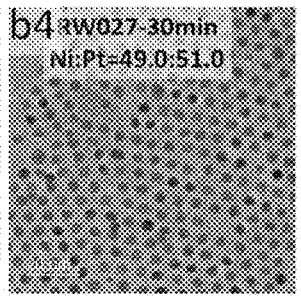
Fig. 10A  Fig. 10B  Fig. 10C  Fig. 10D
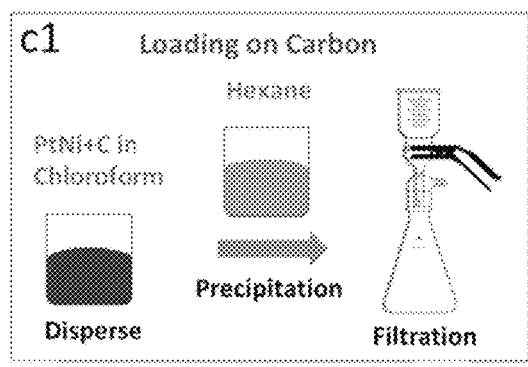
Fig. 11A
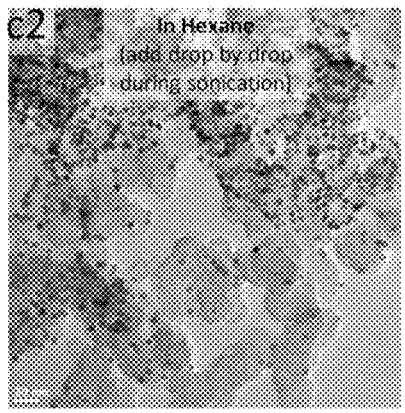 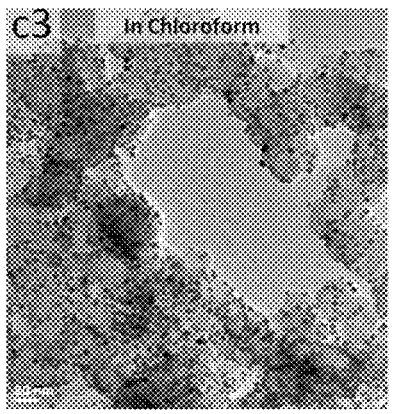
Fig. 11B  Fig. 11C

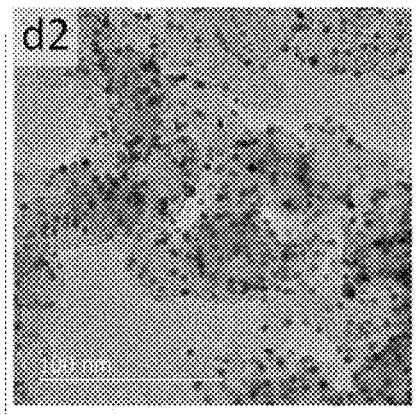
Fig. 12A      Fig. 12B
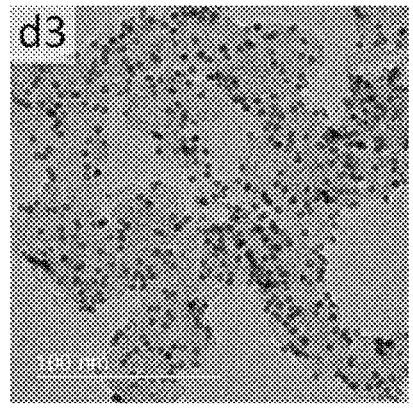
Fig. 12C

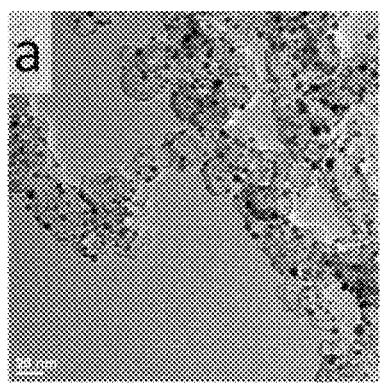
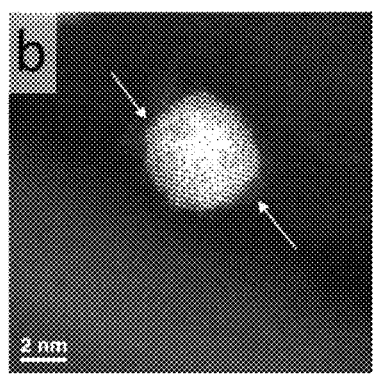
Fig. 14A        Fig. 14B
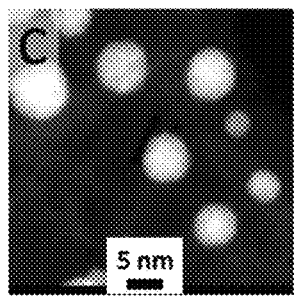
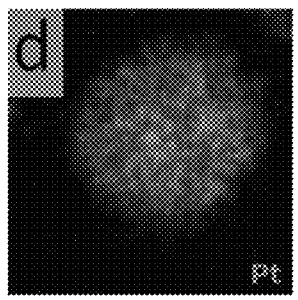
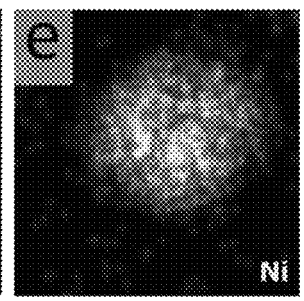
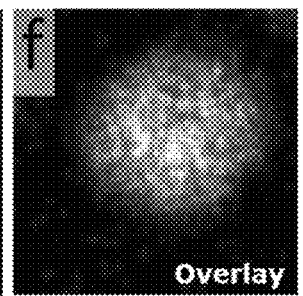
Fig. 14C        Fig. 14D        Fig. 14E        Fig. 14F

| a | ECSA$_{HUPD}$ (cm$^2$) | ECSA$_{CO}$ (cm$^2$) | ECSA$_{CO}$/ECSA$_{HUPD}$ | SSA$_{CO}$ (m$^2$/g) | Pt:Ni (atomic) |
|---|---|---|---|---|---|
| Batch 1 of 5g/batch | 0.684 | 0.946 | 1.38 | 60 | 1.37:1 |
| Batch 2 of 5g/batch | 0.672 | 0.923 | 1.37 | 63.5 | 1.35:1 |
Fig. 15A
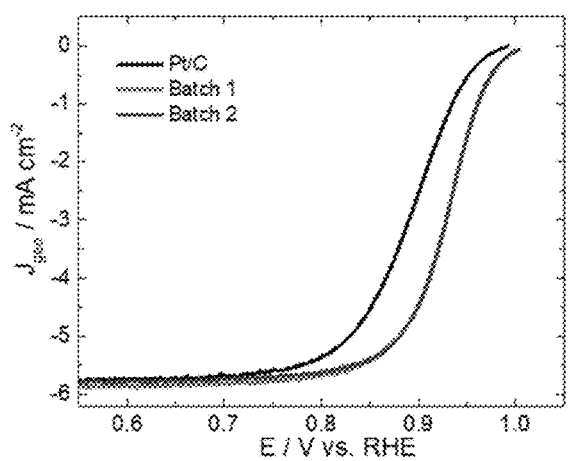
Fig. 15B
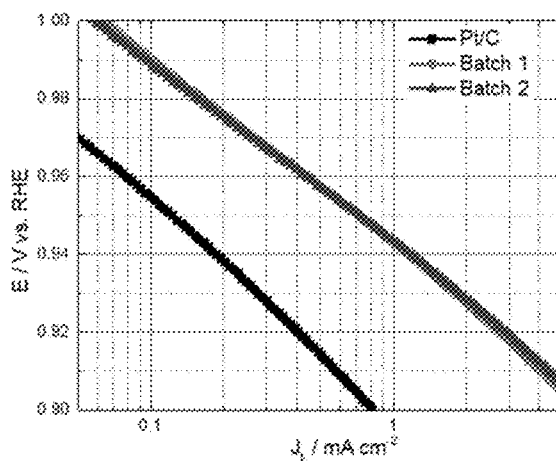
Fig. 15C
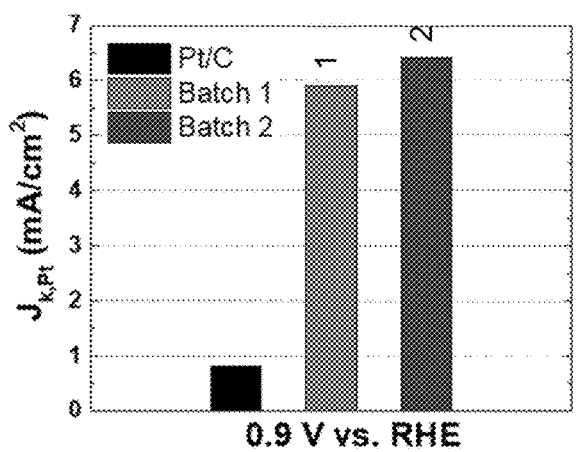
Fig. 15D
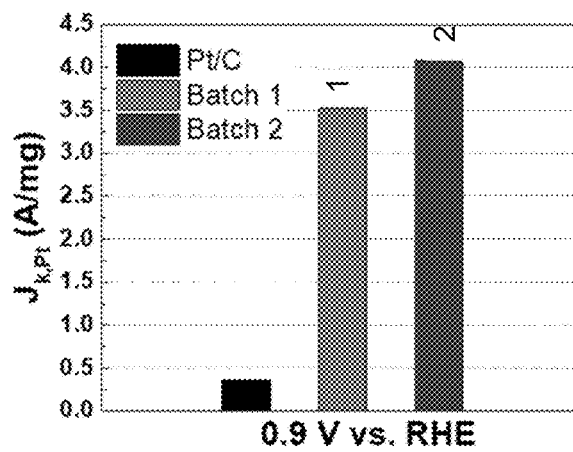
Fig. 15E

SYSTEMS AND METHODS FOR SCALE-UP SYNTHESIS MULTI-LAYERED PT-SKIN NANOPARTICLE CATALYSTS

The United States Government claims certain rights in this invention pursuant to Contract No. W-31-109-ENG-38 between the United States Government and the University of Chicago and/or pursuant to DE-AC02-06CH11357 between the United States Government and UChicago Argonne, LLC representing Argonne National Laboratory.

TECHNICAL FIELD

The present disclosure relates generally to method of synthesizing and compositions for platinum based nanomaterials, particularly platinum nickel nanoparticle catalysts for the oxygen reduction reaction.

BACKGROUND

In the last few decades, significant efforts have been devoted to improving the activity and durability of Pt based nanomaterials for oxygen reduction reaction (ORR) aiming to overcome the high price and scarcity problems of Pt based catalysts for fuel cell application in stationary and automobile sectors. Since the discovery of the 90-fold activity improvements of nano-segregated $Pt_3Ni(111)$ surface in comparison to commercially available platinum on carbon (Pt/C) catalyst, a variety of nanocrystals with different shapes and significant improved activities have been developed, in most cases, using solution-phase synthesis methods. In contrast to Pt/C catalyst prepared by impregnation method, these nanocrystals made by solution-phase synthesis usually have well controlled shape, composition and monodispersed particle size, thus their surfaces could be fine-tuned to give much higher catalytic activities. However, usually these highly active nanocrystals can only be made in milligram scale because great attention has to be paid in the synthesis and post-treatment processes in order to keep the desired morphologies, particle sizes and surface composition profiles. This is barely enough for physical characterizations and electrocatalytic activity testing on rotating disk electrode (RDE), their performances in real fuel cell membrane electrode assembly (MEA) have been rarely investigated which greatly hinders the commercialization of fuel cell technology. Gram scale of high quality nanocrystal catalyst should be made available for MEA testing, in order to bridge the gap between fundamental researches and real device investigations.

It is generally very challenge to scale up nanomaterials because their formation processes are very sensitive to different reaction parameters which usually inevitably change with the increase of the reaction volume and sometimes even trace amount of impurities in the precursors or solvents will result in total different morphologies. This critical information for scale up are usually not known when the material synthesis was discovered and extensive researches are required to reveal the true factors govern the nanomaterial formation and furthermore if these factors can be controlled at larger scale. Only at this point, one can tell if this material is scalable and the best way to scale it up either using traditional batch synthesis or in a microfluidic chip or tubular channel of continuous flow reactors where the reaction parameters can be controlled in a more precise way. When comes to electrocatalytic materials, synthesis of nanocrystals is only the start of the electrocatalyst preparation. These nanocrystals should be uniformly loaded onto conducting materials such as high surface area carbon particles. In most cases, the surfactant used to stabilize the growth of nanocrystals should be removed and desired surface structures will be created by chemical or electrochemical leaching and/or further annealing processes. The electrocatalyst can only be scaled up when every single step of the multi-step process is proven to be scalable. In this regards, recent shape controlled synthesis of nanocrystals using solid state chemistry method significantly simplify the electrocatalyst preparation process. However, the control of nanocrystal shape, size and composition of solution-phase synthesis is superior to solid-state reactions and usually results in much higher catalytic activities.

Multi-layered Pt-skin nanoparticle catalyst have been synthesized by solution-phase synthesis. Solution-phase synthesis provides the advantage of shape, size and composition control of solution-phase synthesis. U.S. Pat. No. 9,246,177 describes one process for monodispersed PtNi bi-metallic nanoparticles, such as with a size of around 5 nanometers (nm), using a hot-injection synthesis method in organic solvent. As shown in FIG. 1A, prior techniques for synthesis have utilized a hot injection method that requires a multi-step process of 1) injection facilitated synthesis, 2) loading on carbon, 3) acid leaching, and 4) annealing. In step 1, a mixture of nickel acetate tetrahydrate, 1,2-tetradecanediol, oleic acid, oleylamine, and either diphenyl ether or dibenzyl either is heated to 200 C. To this heated mixture, a pre-heated (~80 C) Pt solution is injected. The Pt solution comprises platinum (II) acetylacetonate in 1, 2-dichlorobenzene. The combined solution is then held at 200 C for an hour. After separation from synthesis solvents, in a second step the PtNi nanoparticles are loaded onto high surface area carbon by evaporating off the solvents from the first step. Next, in a third step the resultant loaded PtNi/C material is acid leached by sonicating directly in the acidic solution and then centrifuged to separate the acid. In a fourth step, the acid leached PtNi/C undergoes annealing in hydrogen atmosphere to smoothen the surface and form a Pt-skin surface structure. With all these sophisticated synthesis and post-treatment procedures, a nanoparticle catalyst with multi-layered Pt-skin structure similar with that on bulk thin film surface was prepared which shows over 6 fold activity enhancement and significant durability improvement compared with commercial Pt/C catalyst.

However, this process exhibits several drawbacks and flaws that hinder scaling of the process. First, the pre-heated injection of platinum material in Step 1 is not practical for larger scale processes. In fact, due to the energy involved, scaling up this step can result in an increased probability of an explosion occurring. Further, the injection process may cause temperature drop and mixing problems which will affect the particle formation. Also, the 1,2-dichlorobenzene has a boiling point of 180.5° C., meaning the Pt material cannot be preheated in the 1,2 dichlorobenzene to match the temperature of the mixture. This can result in further complications as the 1,2, dichlorobenzene may flash boil when injected. Step 2 also has drawbacks, as the evaporation of the solvents is both energy intensive and time consuming. Further, the evaporation presents difficulty as the volume of solvent increases with scaling of the process. Further, the hexane material exhibits difficulty in uniform dispersion of the PtNi nanoparticles, resulting in nonuniform loading of the carbon. Further, other solvents such as chloroform exhibit issues with removal of the PtNi/C material from the remaining solvent. In Step 3, the PtNi/C again exhibits difficulty in dispersing within the liquid, in this case the acid. Nickel content was lost from the PtNi/C due to the extended time necessary for sonication to achieve a sufficiently dispersion of the PtNi/C to achieve the acid leaching.

SUMMARY

Embodiments described herein relate generally to a method of synthesizing Pt nanoparticle catalyst comprising the steps of: synthesizing PtNi nanoparticles, isolating PtNi/substrate nanoparticles, acid leaching the PtNi/substrate, and annealing the leached PtNi/substrate nanoparticles, forming a Pt-skin on the PtNi/substrate nanoparticles. The synthesizing proceeds by mixing a nickel precursor, a reducing agent, a surfactant, a platinum precursor, and a polar solvent at a temperature of at least 200 C for at least 30 minutes forming a PtNi nanoparticle solution. The isolating proceeds by sonicating the PtNi nanoparticle solution with substrate in chloroform solution; adding hexane to the sonicated chloroform solution; precipitating PtNi/substrate nanoparticles; and collecting the PtNi/substrate nanoparticles by filtration. The acid leaching the PtNi/substrate proceeds by sonicating the collected PtNi/substrate nanoparticles in water; mixing an acid with the sonicated PtNi/substrate sonicated in water for 60 minutes; and collecting the leached PtNi/substrate nanoparticles by filtration.

Other embodiments relate to a method of manufacturing Pt skin nanoparticles comprising. The method comprises isolating PtNi/carbon nanoparticles by: sonicating a PtNi nanoparticle solution with carbon dispersed in a chloroform solution; adding hexane to the sonicated chloroform solution; precipitating PtNi/carbon nanoparticles; collecting the PtNi/carbon nanoparticles by filtration. The method further comprises acid leaching the PtNi/carbon by sonicating the collected PtNi/carbon nanoparticles in water; mixing an acid with the sonicated PtNi/carbon sonicated in water for 60 minutes; and collecting the leached PtNi/carbon nanoparticles by filtration. The method further comprises annealing the leached PtNi/carbon nanoparticles, forming a Pt-skin on the PtNi/substrate nanoparticles.

In another embodiment, synthesizing PtNi nanoparticles comprises mixing a nickel precursor, a reducing agent, a surfactant, a platinum precursor, and a polar solvent at a temperature of at least 200 C for at least 30 minutes forming a PtNi nanoparticle solution. The method further comprises isolating PtNi/substrate nanoparticles by: sonicating the PtNi nanoparticle solution with substrate in chloroform solution; adding hexane to the sonicated chloroform solution; precipitating PtNi/substrate nanoparticles; and collecting the PtNi/substrate nanoparticles by filtration. The method also comprises acid leaching the PtNi/substrate.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

FIGS. 2A-D show TEM images of PtNi nanoparticles synthesized with injection (FIGS. 2A & 2C) or one-pot (FIGS. 2B & 2D) procedure at 200° C. for 1 h using benzyl ether as solvent.

FIGS. 6A-F show EDX results (FIGS. 6A & 6D) and TEM images (FIGS. 6B & E for 10 min and FIGS. 6C & F for 60 min) of PtNi nanoparticles synthesized by injection (FIGS. 6A, B, & C) and one-pot procedures (FIGS. 6D, E, & F) using phenyl ether as solvent at 200° C. for different time.

FIG. 7 shows PtNi nanoparticles synthesized with one-pot procedure using phenyl ether as solvent without 1,2-dichlorobenzene.

FIGS. 10A-D are TEM images of four batches PtNi nanoparticles synthesized by small-scale one-pot procedure.

FIGS. 11A-C show the procedure to load PtNi nanoparticles on carbon and TEM image of the supported catalyst loaded in hexane (FIG. 11B) and chloroform precipitated with hexane (FIG. 11C).

FIGS. 12A-C photo image (FIG. 12B) for one batch and TEM images (FIGS. 12B & 12C) for two batches carbon supported PtNi nanoparticles synthesized with scaled up one-pot procedure and newly developed loading procedure.

FIGS. 14A-F show TEM of scaled up multi-layered Pt-skin nanoparticle catalyst. FIG. 14A shows low resolution TEM image. FIG. 14B shows high resolution TEM image. FIG. 14C-F show EDX mapping.

FIGS. 15A-H electrochemistry results of two batches multi-layered Pt-skin nanoparticle catalysts made at 5 g/batch scale. FIG. 15A shows a summary of electrochemistry surface area from RDE testing and atomic ratio from ICP. FIG. 15B-E show ORR polarization curves and Pt surface area and mass specific activities. FIG. 15F-H show dissolution rates of Pt and Ni in the process of RDE testing from in-situ ICP coupled with electrochemistry testing.

FIG. 16A is a graph of ORR mass activity; FIG. 16B shows voltage per mA/area; FIG. 16C shows net electrochemical activity as a function of relative humidity;

FIG. 16D shows transport resistance as a function of the area of Pt relative to the area of the MEA as a whole.

Figure 1A:
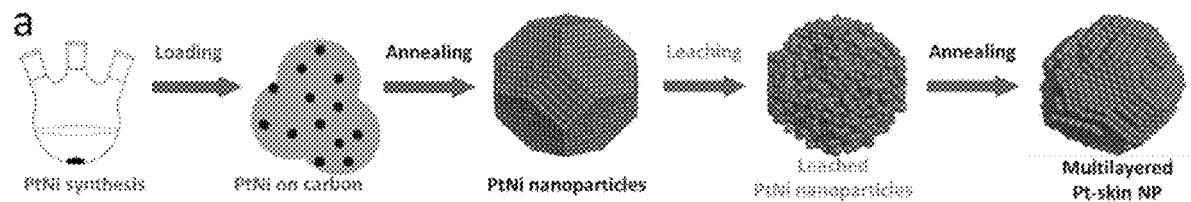
FIG. 1A is a schematic illustration of a multi-step synthesis procedure of multi-layered Pt-skin nanoparticle catalyst.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Described herein is a scalable process to manufacture multi-layered Pt-skin nanoparticle catalysts that can be produced reproducibly in 5 g/batch scale. Further, the scaled up catalyst show even higher catalytic activity than prior small-batch non-scalable solution synthesis techniques, as well as a significant performance enhancement compared with commercial Pt/C catalyst in 50 $cm^2$ MEA.

FIG. 1A show a synthesis process in accordance with one embodiment. Step 1 is a one-pot synthesis using diphenyl ether. Step 2 is a loading of the PtNi nanoparticles on carbon and removal of the resultant loaded material by precipitation and filtration. Step 3 is acid leaching of the PtNi/C material by dispersion of the material in water and acidification of the dispersion followed by filtration recover. Step 4 is annealing of the leached PtNi/C material.

Figure 1B:
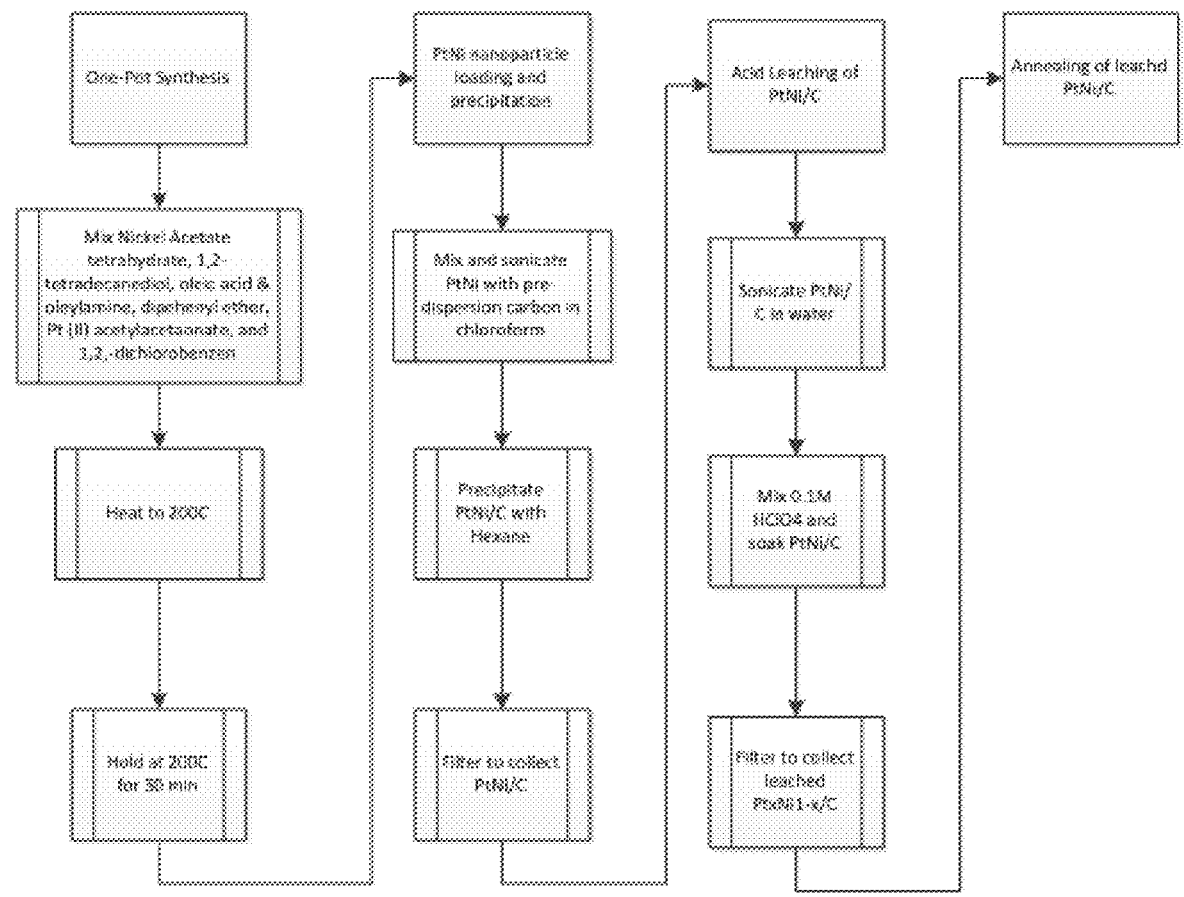
FIG. 1B illustrates a detailed multi-step process for one embodiment of an improved PtNi synthesis.
Figure 3A:
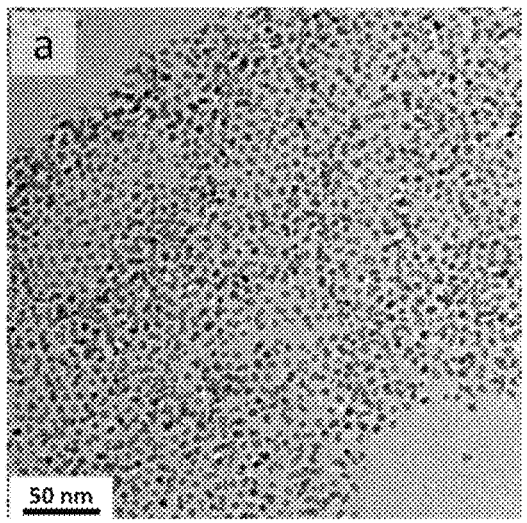
FIGS. 3A-D show TEM images (200° C., 10 min (FIG. 3A); 20 min (FIG. 3B); 30 min (FIG. 3C); 60 min (FIG. 3D); 120 min (FIG. 3E)), particle size, and composition (FIG. 3F) of PtNi nanoparticles as function of reaction time synthesized with one-pot procedure at different temperatures using benzyl ether as solvent.
Figure 3B:
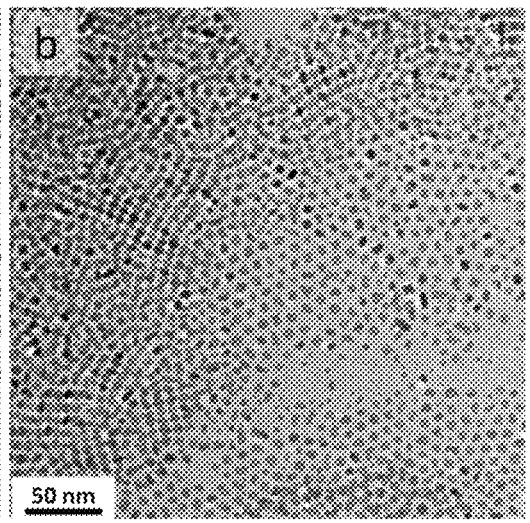
Figure 3C:
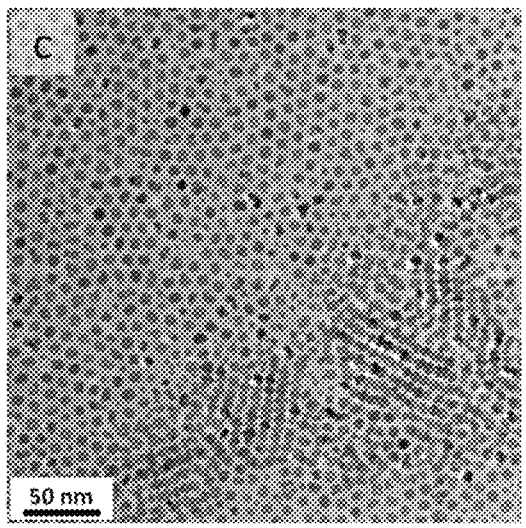
Figure 3D:
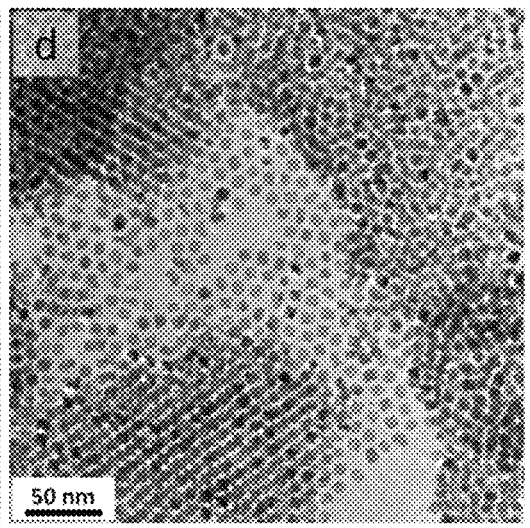
Figure 3E:
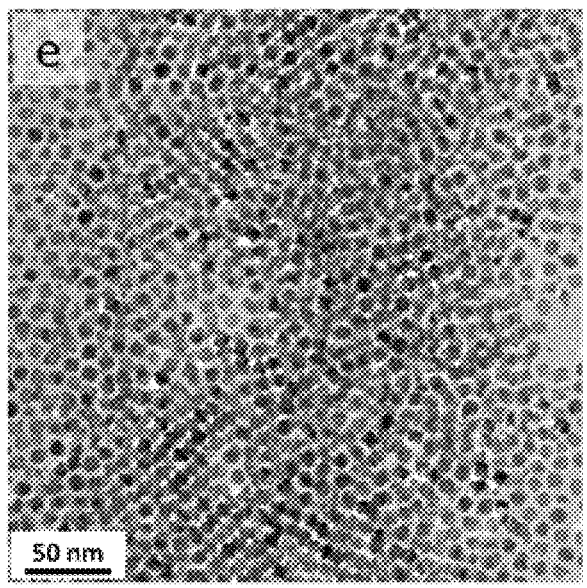

A more detailed method is illustrated in FIG. 1B. In one embodiment, Step 1 includes the addition of a nickel precursor, such as nickel acetate tetrahydrate a reducing agent such as 1,2-tetradecanediol a surfactant such as oleic acid, oleylamineplatinum precursors, such as platinum (II) acetylacetonate. and In one embodiment, a polar solvent such as 1,2-dichlorobenzene is utilized. The 1,2-dichlorobenzene results in increased uniformity in particle size. The ratio of oleic acid to oleylamine may be varied to control particle size, with increasing ratio of oleic acid associated with smaller particle size.

Further, the initial synthesis step, the process proceeds by a one pot approach. In one embodiment, the materials are added without order requirement. The materials may be purged with an inert gas at greater than room temperature to remove hydrate water, such as from the nickel precursor. The temperature to remove water could be between 100 C and 150 C for several minutes to several hours. In the tested embodiments described below, materials are purged with Ar at 110 C for 30 min (small scale) or 2-3 h (5 g/batch scale) to remove hydrate water (from Nickel acetate tetrahydrate). Once the materials have been added to the "one pot", the reaction proceeds a reaction temperature such as, between 195 C and 205 C, for example 200 C. Reaction time is 10 min to as long as 2 hours.

Figure 4:
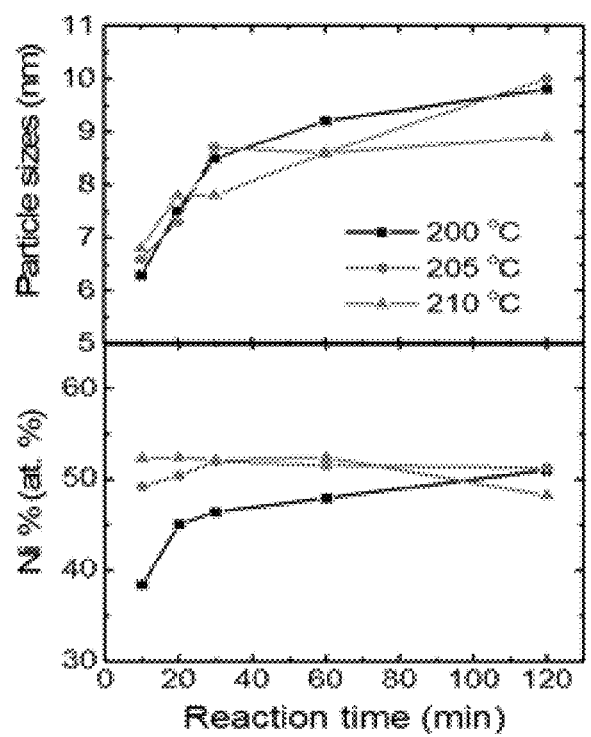
FIG. 4 shows particle size, and composition of PtNi nanoparticles as function of reaction time synthesized with one-pot procedure at different temperatures using benzyl ether as solvent.
Figure 5:
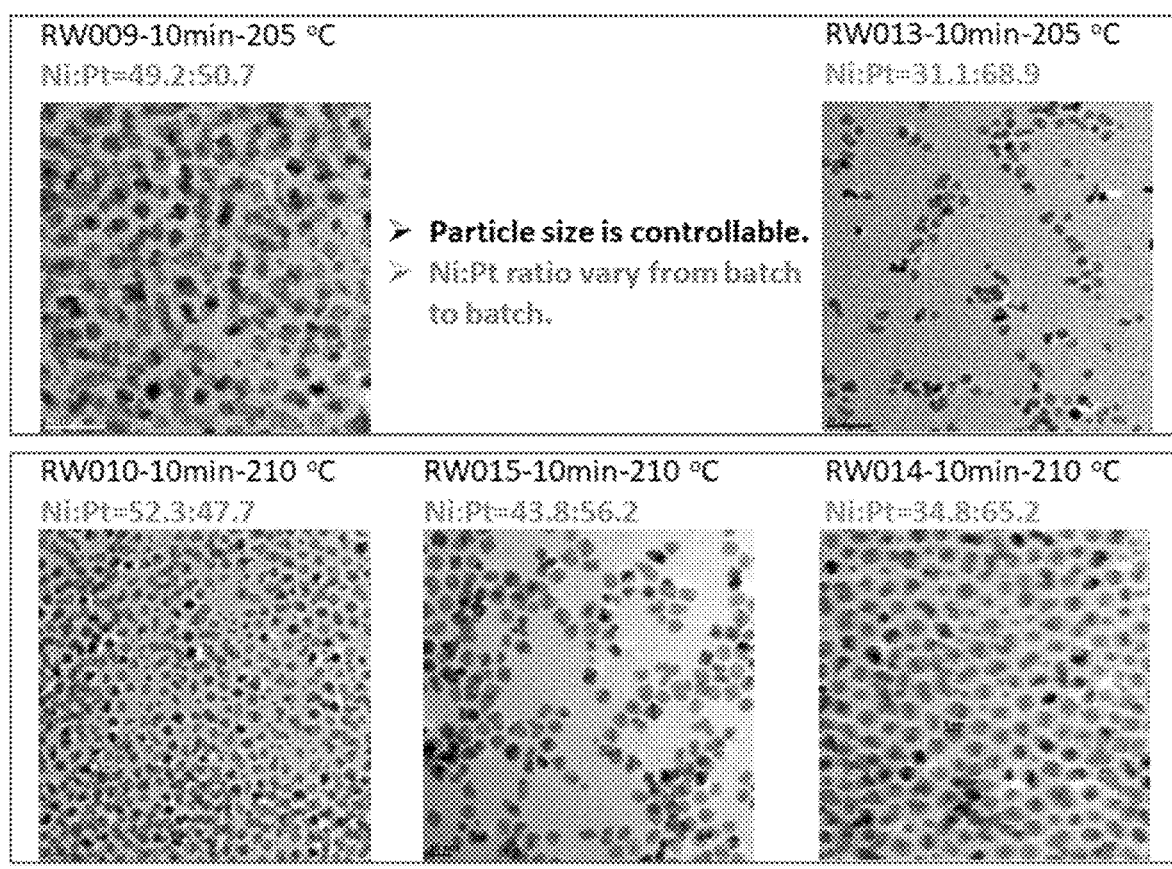
FIG. 5 shows reproducibility of PtNi nanoparticle synthesis using benzyl ether as solvent.

It was discovered that when using benzyl ether as solvent in the prior art injection process, the resultant particle is slightly larger than using that prior art process with phenyl ether as a solvent (~7.5 nm vs. ~5 nm). This is notable as most of the particles are octahedral in contrast to truncated octahedral using injection process. While the octahedral particle may have higher activity the structure may not be preserved after annealing step. A one pot synthesis approach that uses dibenzyl ether was observed to result in an even larger increase in particle size. (7.9 nm, FIG. 2). While reaction time was observed to impact particle size somewhat, temperature, within reason, was not. For example, with only 10 min of reaction, the particle size is already ~6 nm and it keeps growing with reaction time and eventually grew to around 10 nm after 2 hours (FIG. 3A-E). This trend does not change with reaction temperature (FIG. 4) or simple change of precursor/surfactant/reductant ratio. Despite the decreased yield for shorter reaction time, one may control the particle size to be smaller than 6 nm by quenching the reaction at shorter reaction time for small scale synthesis. However, it would be a challenge to control the reaction time precisely for scale up reaction given the fact that heating up and cooling down large volume of reaction is slow. More importantly, such an approach results in Ni contents in the particle that vary notably with different synthesis batches (FIG. 5).

Figures 8, 9:
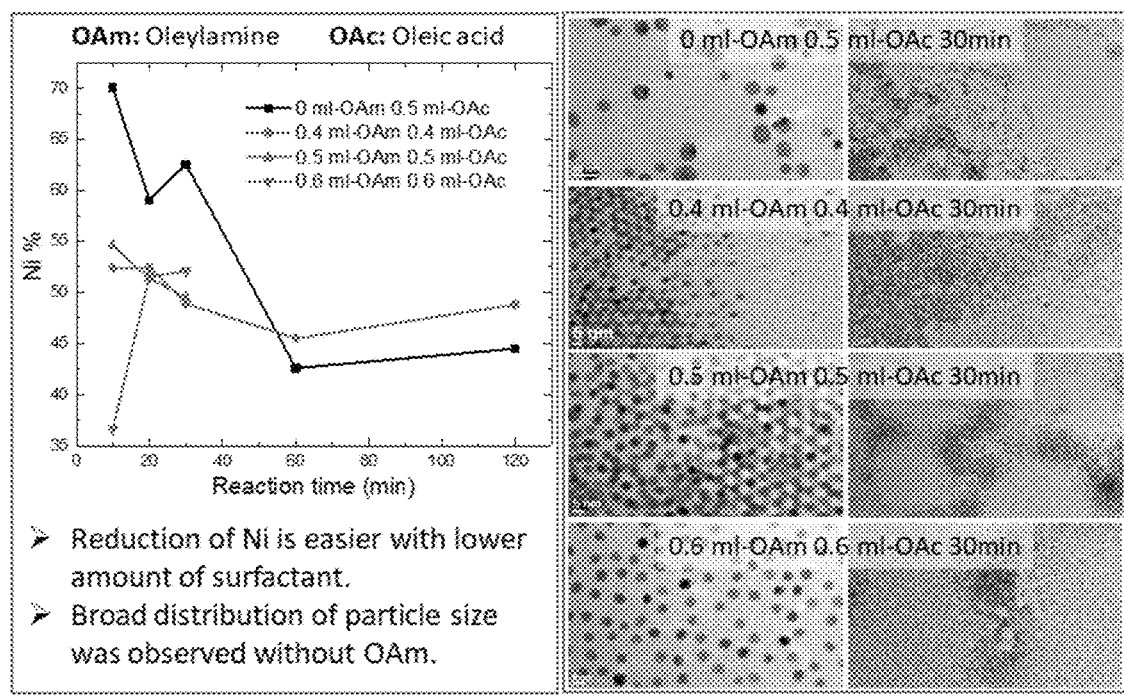
FIG. 8 shows PtNi nanoparticles synthesized with one-pot procedure using phenyl ether as solvent with different amounts of surfactants.
FIG. 9 shows the effect of reducing agent amount.

However, in one embodiment, a one-pot synthesis approach does result in acceptable particle size and composition for the PtNi nanoparticles. In such an embodiment, solvent for the on-pot synthesis is a phenyl ether as solvent. Surprisingly, the one pot synthesis gives exactly the same particle size (~4 nm) and composition (Pt:Ni=1:1) as with the small scale only injection process (FIG. 6). For both synthesis, the particle size does not change with reaction time after 10 min, while the composition only changes slightly. Elimination of either dichlorobenzene or oleylamine will result in non-uniform particle size (FIGS. 7 & 8). The particle size and composition do not change by slightly increasing of surfactant amount (from 0.4 ml to 0.5 ml). Further increase of the surfactant amount to 0.6 ml result in less Ni in the particle at early stage of the reaction (FIG. 8). Slightly decrease of reducing agent to ¾ of that used in the injection synthesis doesn't affect the particle size and composition; while further decrease or total elimination of reducing agent result in decrease of particle size and Ni content (FIG. 9). These results indicate that co-reduction of Ni and Pt is possible with the presence of oleylamine, but the reduction of Ni is enhanced by the presence of stronger reducing agent 1,2-tetradecanediol at the same time the surfactant may coordinate with Ni precursor and their amounts together with reducing agent amount control the reduction kinetics. After establishment of the preferred reaction condition for the one pot synthesis, the reproducibility was further demonstrated by several batches of synthesis. As shown in FIG. 10A-D, the particle size and composition do not vary with different synthesis batches. As shown later, the one-pot synthesis procedure is scalable to at least 5 g catalyst/batch with same quality of PtNi nanoparticle and good reproducibility.

With regard to Step 2, returning to FIG. 1B, the PtNi nanoparticles from Step 1 are loaded onto a substrate and then collected. The substrate utilized in the tests described herein was carbon, such as for use in fuel cells. The substrate is preferably acid corrosion resistant and conductive. The PtNi particles are mixed and sonicated with pre-dispersed carbon. Carbon was dispersed in chloroform with ratio of 0.1-0.4 g carbon in 100 ml chloroform by sonication (10 min to 2 h dependents on amount of carbon). Carbon was dispersed in chloroform by sonication. Then particle dispersed in chloroform were mixed in. then further sonication for 10-20 min. The Pt/Ni then "loads" onto the carbon in the chloroform. The loading can be tuned by changing the particle carbon ratio. In one embodiment, loading can be up to 20% weight of PtNi on carbon. After loading, the PtNi/C is precipitated by adding a solvent for example hexane or heptane. With the PtNi/C precipitated or precipitating out of the liquid, filtration is utilized to collect the solid PtNi/C. Alternatively, centrifugation could also be used as could evaporation of the solvent (e.g., hexane). In one embodiment, pressurized filtration is used. In the examples described herein, a filter of polycarbonate with size of 0.1-0.4 um was used. Larger pore size provides for faster filtration. But as long as the catalyst amount vs. filter area achieves a desired value (for 0.4 um filter, 20 mg catalyst/cm2 filter area), pore size of filter doesn't matter since the limiting step is the solvent going through the catalyst layer. A 0.1-0.4 um pore size filter can remove everything from the mixture (solvent goes through filter are clear).

For larger amount of PtNi nanoparticles, the dispersion of nanoparticle on carbon is not uniform in pure hexane even by adding particles into carbon (both dispersed in hexane) drop by drop during sonication as shown in FIG. 11B. This difficulty in loading at higher amounts of PtNi was exhibited by the prior injection process described previously. Further, such non-uniform dispersion of PtNi nanoparticle on carbon will cause sintering problem in the later annealing steps. As described, in one embodiment, the PtNi is dispersed with carbon using chloroform as dispersing solvent. The use of chloroform results in more uniform loading. However, the very properties that make for a superior dispersing solvent mean that catalyst separation from chloroform is very challenging. Significant amounts of PtNi particles are still left in chloroform when utilizing the centrifuging separation described in the prior art. For example, separating by centrifuging at 8000 rpm as described above for the separation step of the injection process in small scale is not feasible. It has been observed that in accordance with embodiments described above, adding hexane into chloroform dispersed carbon and PtNi nanoparticles surprisingly results in carbon supported PtNi nanoparticles precipitating out from the mixture in several minutes and more importantly, the dispersion of PtNi nanoparticle on carbon is very uniform as shown in FIGS. 11A & 11C. In one embodiment, a Hexane:chloroform ratio higher than 1:1 is used. Generally, the higher the hexane ratio, the faster separation. The speed of the separation depends on different factors, including particle size of PtNi (with bigger particle size equating to faster separation). Generally, separating occurs in 5-30 min for 99.9% separation. The uniform loading of PtNi nanoparticles on carbon in chloroform and its easy separation by adding hexane may be related to the density similarity and difference of surfactant protected PtNi nanoparticle with chloroform and hexane, respectively.

The as-described Step 2 of the one-pot process has been demonstrated to produce PtNi nanoparticles loaded onto carbon at 5 g catalyst/batch scale uniformly and reproducibly as shown in FIG. 12. In a further embodiment, the described Step 2 may be utilized as a loading process in other platinum nanoparticle synthesis techniques. For example, the described chloroform facilitated loading and hexane induced precipitation may be used to load larger Pt alloy nanoparticles such as polyhedra and nanoframes uniformly (the precipitation of these nanomaterials from solvents is faster than carbon supported smaller nanoparticles) on different carbons indicating extended application potentials.

With regard to step 3, returning to FIG. 1B, the PtNi/C is sonicated in water.

Figure 13A:
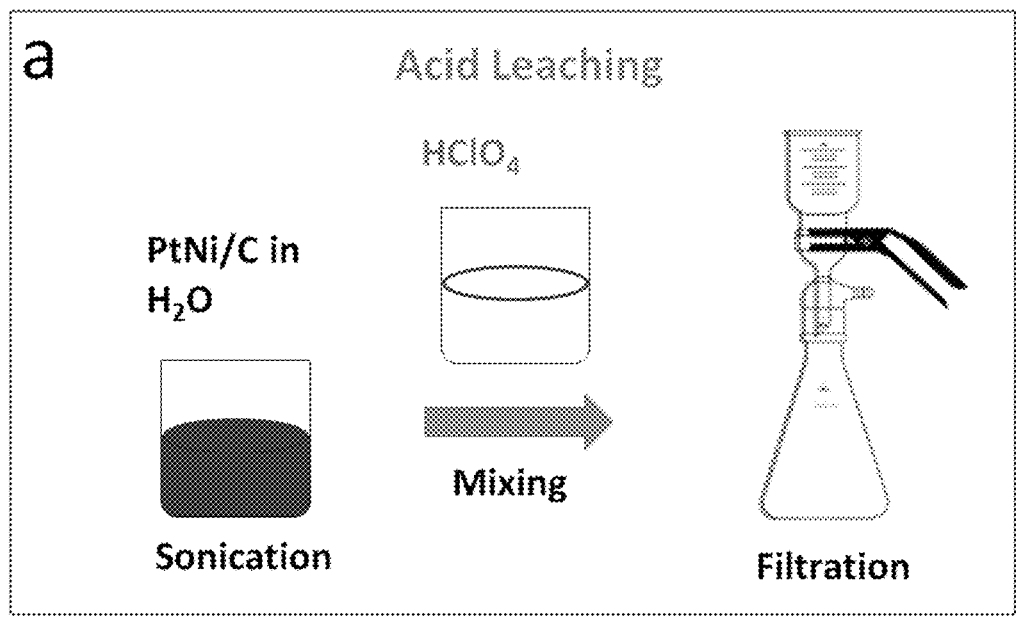
FIG. 13A shows modified procedure for acid leaching.
Figure 13B:
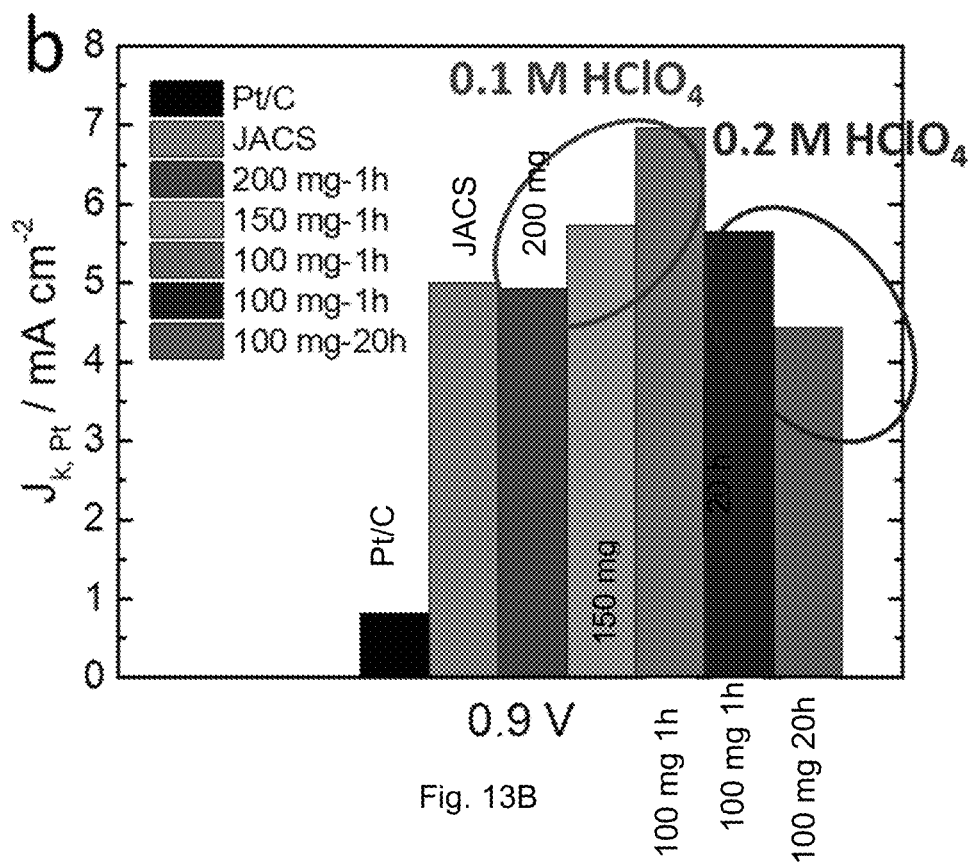
FIG. 13B shows Specific activity at 0.9V as function of acid leaching condition.
Figures 15F, 15G, 15H:
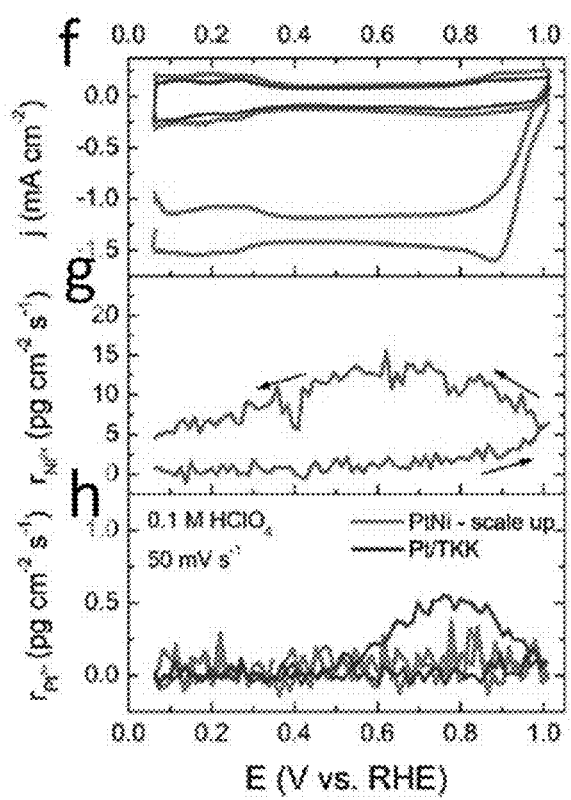
Figure 16A:
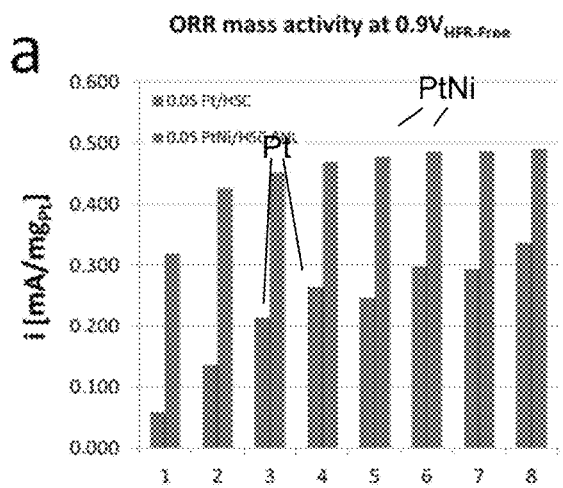
FIGS. 16A-D show results of 50 $cm^2$ Membrane Electrode Assembly measurement.
Figure 16B:
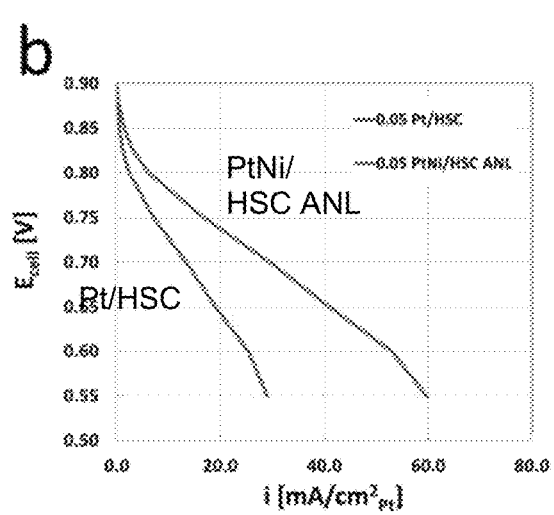
Figure 16C:
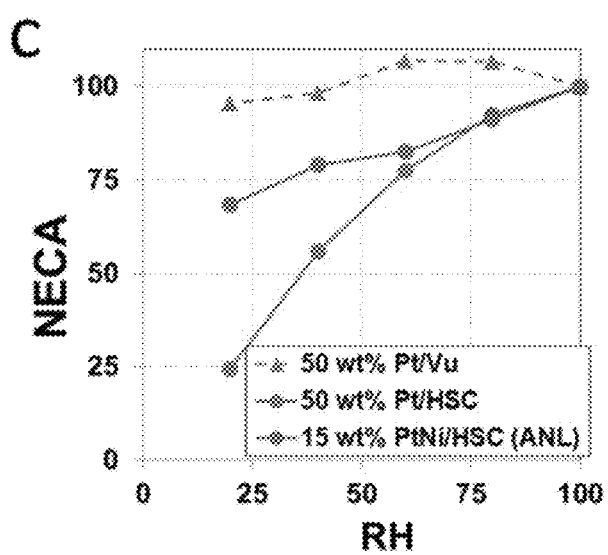
Figure 16D:
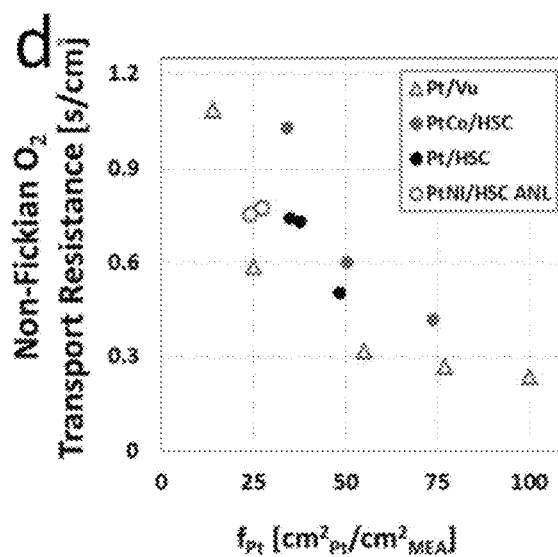
Figure 17:
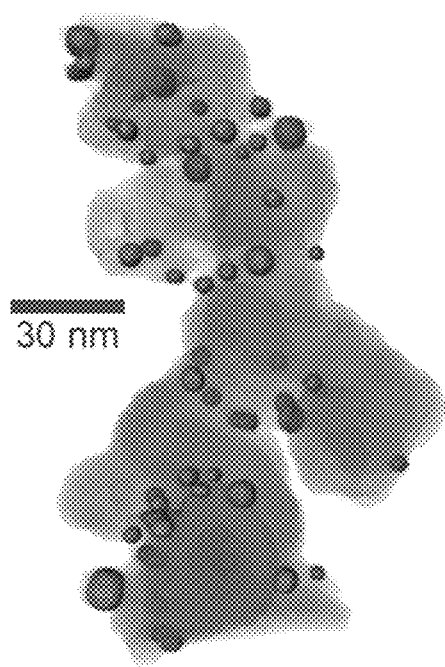
FIG. 17 show TEM images and TEM tomography of scaled up multi-layered Pt-skin nanoparticle catalyst.

In the original synthesis, PtNi nanoparticles supported on carbon was dispersed in 0.1 M $HClO_4$ by sonication to leach the surface Ni in order to create a PtNi core/Pt shell structure. For larger amount of catalyst, prolonged sonication is required to disperse the supported catalysts well in acid, which results in significant amount of Ni loss in the particle and activity decline. To address this problem, supported catalyst was dispersed in pure water by sonication and then mixed with perchloric acid (FIG. 13A). The separation of dispersion and acid leaching steps allow uniform acid leaching and precise control of the acid leaching condition. With the successful synthesis of 5 g supported catalyst in one batch reaction, we were able to investigate the acid leaching condition more carefully without worrying the variation of nanoparticle quality. The best acid leaching condition was established by monitoring the ORR activity with function of acid concentrations, acid/catalyst ratio and acid leaching time (FIG. 13B). The Pt surface area specific activity of the catalyst made under the best acid leaching condition in 0.1 M $HClO_4$ at 0.9 V is 1.4 times higher than original small batch synthesis and 8.5 times higher than Pt/C catalyst, which indicates an optimized Pt-skin structure formation. The resultant Pt skin is thinner than that reported for the injection method (see FIGS. 14C-F).

With the best acid leaching condition applied to the carbon supported PtNi nanoparticle and further annealing at 400° C. under hydrogen/argon flowing, high quality multi-layered Pt-skin nanoparticle catalysts were produced at 5 g/batch scale reproducibly. As shown in FIG. 14A, multi-layered Pt-skin nanoparticles are distributed on carbon supported uniformly indicating minimized sintering during the 400° C. annealing step thanks to the uniform loading of PtNi nanoparticle on carbon in the loading step. The Pt-skin structure was clearly shown in FIGS. 14B-F.

The annealing atmosphere is the same, annealing temperature is the same, annealing time is the same (1h). except annealing tube and tube furnace is larger. Catalyst layer in the alumina boat is thicker. Experiments were done to make sure thicker catalyst layer doesn't affect performance which proves the scalability of this step.

Methods.

Synthesis of PtNi Nanoparticles:

1. Dibenzyl Ether as Solvent

In a 50 ml 4-neck round bottom flask, 0.15 g Nickel acetate tetrahydrate, 0.095 g 1,2-tetradecanediol, 0.4 mL oleylamine, 0.4 mL oleic acid, and 20 mL dibenzyl ether were mixed together by magnetic bar stirring at ~400 rpm for 20 min under argon flow. The solution was heated up to 110° C. Keep the solution at 110° C. for 10 min to remove water. At the same time, 0.186 g platinum acetylacetonate was dissolved in 3 mL 1,2-dichlorobenzene at about 80° C. Heat up the Ni solution to 200° C. at about 10° C./min and inject the Pt precursor once the Ni solution reaches 200° C. Keep the solution at 200° C. for one hour and stop reaction by removing heating mantle and let it cool down to below 50° C. Keep the Ar flow and stirring throughout the synthesis process. PtNi nanoparticles were collected by centrifuging at 8000 rpm and further washed with hexane and ethanol.

2. Diphenyl Ether as Solvent

The synthesis of PtNi nanoparticle using diphenyl ether as solvent is reported in our previous paper (injection procedure, Chao's JACS).

3. One-Pot Synthesis

For one pot synthesis, all the chemicals were mixed together in 50 ml flask and heated at 110° C. for 30 min to remove water before heating up to 200° C. for reaction. To investigate the chemistry of the synthesis, reaction parameters were the same except the noted changes. To track the reaction process, around 0.2 ml samples were taken from the reaction by a syringe with a long needle.

4. Scale Up Synthesis of PtNi Nanoparticles

For scale up synthesis of PtNi nanoparticles, diphenyl ether was used as solvent and the best reaction condition of one-pot synthesis was established by investigating the chemistry and demonstrating the reproducibility. To make enough PtNi nanoparticle for 5 g catalyst, 2.5 g Nickel acetate tetrahydrate, 1.95 g Platinum acetylacetonate, 1.28 g 1,2-tetradecanediol, 7.5 ml oleylamine, 7.5 ml oleic acid, 45 ml 1,2-dichlorobenzene, and 300 ml diphenyl ether were mixed together in a 1 L round bottom flask. The reaction solution was heated up to 110° C. and water was removed by flowing Ar for 2 hours. PtNi nanoparticles were synthesized by raising temperature to 200° C. and keeping at this temperature for 30 min.

Loading of PtNi Nanoparticles on Carbon:

Proper amount of carbon was dispersed in either hexane or chloroform by sonication. PtNi nanoparticles dispersed in either hexane or chloroform was mixed with carbon dispersed in corresponding solvent and sonicated for 20 min. Carbon supported PtNi nanoparticles were precipitated from chloroform by adding same volume of hexane. The newly developed loading procedure works for different particle size and different carbons. The precipitated materials were collected by filtration and dried in vacuum oven at 80° C. overnight. The surfactants on the surface of PtNi nanoparticles were removed by annealing in a furnace at 185° C. for 20 hours in air.

Acid Leaching:

Carbon supported PtNi nanoparticles were dispersed in water by sonication and same amount of 0.1 M or 0.2 M $HClO_4$ was added. The material was soaked in the acid for different time and collected by filtration and cleaned by water. The collected materials were dried in vacuum oven at 80° C. overnight.

Annealing:

Acid leached PtNi nanoparticles supported on carbon were annealed at 400° C. for 1 hour in an tube furnace under flow of forming gas.

Electrochemistry:

All the electrochemistry testing were performed at room temperature in 0.1 M $HClO_4$ electrolyte within a three-electrode configuration. The electrochemical cell and all its components were cleaned in concentrated $H_2SO_4/HNO_3$ and washed in boiling water (18.2 MΩ) before each measurement. A commercially available Ag/AgCl electrode was connected to the electrochemical cell with a salt bridge and used as reference electrode. The potential of reference electrode was calibrated with hydrogen evolution/oxidation reaction in each experiment. Catalyst was loaded onto a glassy carbon rotating disk electrode and used as working electrode. Pt wire coil is counter electrode. Catalyst ink with concentration of 0.5 mg/ml was made before each measurement. Depending on the Pt mass loading of the catalyst, 15-25 μl of ink was loaded onto glassy carbon electrode. The exact loading of Pt on glassy carbon electrode was determined with ICP measurement from the same ink. Pt mass activity was obtained based on ICP measurement. A stable state of the electrode was achieved after 20 cyclic voltammetry (CV) cycling between 0.06 and 1V with 50 mV/s scan before the ORR was measured using a 20 mV/s CV scanning. Double layer capacitance under Ar purging was subtracted and electrolyte resistance was corrected by iR compensation. Pt electrochemical surface area (ECSA) specific activity was obtained by normalizing the current to ECSA from carbon monoxide stripping. Pt and Ni dissolution was monitored with a home-built in-situ ICP-MS and the experiment details can be found in our previous publication (ACS Catal. 2016, 6, 2536-2544).

Characterizations:

PtNi nanoparticles and carbon supported catalysts were dispersed in solvents (either hexane or ethanol) by sonication and a drop of the suspension was loaded onto TEM grid for TEM measurements. Low resolution TEM images were obtained on JEM-2100 F (200 kV) equipped with an EDX detector.

As used herein, the singular forms "a", "an" and "the" include plural referents unless the context clearly dictates otherwise. Thus, for example, the term "a member" is intended to mean a single member or a combination of members, "a material" is intended to mean one or more materials, or a combination thereof.

As used herein, the terms "about" and "approximately" generally mean plus or minus 10% of the stated value. For example, about 0.5 would include 0.45 and 0.55, about 10 would include 9 to 11, about 1000 would include 900 to 1100.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A method of synthesizing Pt nanoparticle catalyst in a quantity of at least 5 grams/batch comprising the steps of:
synthesizing PtNi nanoparticles by:
mixing together a nickel precursor, a reducing agent, a surfactant, a platinum precursor, and a polar solvent consisting essentially of 1,2-dichlorobenzene and diphenyl ether in one pot at a temperature of at least 200° C. for at least 30 minutes, thereby forming a PtNi nanoparticle solution;
isolating PtNi/substrate nanoparticles by:
sonicating the PtNi nanoparticle solution with substrate in chloroform solution, the chloroform solution causing PtNi nanoparticles to be uniformly loaded on the substrate,
subsequent to the sonicating, adding hexane to the sonicated chloroform solution, the hexane causing precipitation of the PtNi/substrate nanoparticles within a time period of 5 minutes to 30 minutes, and
collecting the PtNi/substrate nanoparticles by filtration;
acid leaching the PtNi/substrate by:
sonicating the collected PtNi/substrate nanoparticles in water,
mixing an acid with the sonicated PtNi/substrate sonicated in water for 60 minutes, and
collecting the leached PtNi/substrate nanoparticles by filtration; and
annealing the leached PtNi/substrate nanoparticles, forming a Pt-skin on the PtNi/substrate nanoparticles.

2. The method of claim 1, wherein the nickel precursor is Nickel Acetate tetrahydrate.

3. The method of claim 2, wherein the reducing agent is 1,2-tetradecanediol.

4. The method of claim 3, wherein the surfactant comprises oleic acid and oleylamine.

5. The method of claim 4, wherein the platinum precursor comprises Pt (II) acetylacetonate.

6. The method of claim 1, wherein the substrate is carbon.

7. The method of claim 1, wherein the acid is $HClO_4$.

8. The method of claim 1, wherein the acid is 0.1 M $HClO_4$.

9. A method of manufacturing Pt skin nanoparticles in a quantity of at least 5 grams/batch comprising:
isolating PtNi/carbon nanoparticles by:
sonicating a PtNi nanoparticle solution with carbon dispersed in a chloroform solution, the chloroform solution causing PtNi nanoparticles to be uniformly loaded on the carbon,
subsequent to the sonicating, adding hexane to the sonicated chloroform solution, the hexane causing precipitation of PtNi/carbon nanoparticles within a time period of 5 minutes to 30 minutes, and
collecting the PtNi/carbon nanoparticles by filtration;
acid leaching the PtNi/carbon by:
sonicating the collected PtNi/carbon nanoparticles in water,
mixing an acid with the sonicated PtNi/carbon sonicated in water for 60 minutes, and
collecting the leached PtNi/carbon nanoparticles by filtration; and
annealing the leached PtNi/carbon nanoparticles, forming a Pt-skin on the PtNi/substrate nanoparticles.

10. The method of claim 9, wherein the acid is $HClO_4$.

11. The method of claim 9, wherein the acid is 0.1 M $HClO_4$.

12. A method of synthesizing Pt nanoparticle catalyst in a quantity of at least 5 grams/batch comprising the steps of:
synthesizing PtNi nanoparticles by:
mixing together a nickel precursor, a reducing agent, a surfactant, a platinum precursor, and a polar solvent consisting essentially of 1,2-dichlorobenzene and diphenyl ether in one pot at a temperature of at least 200° C. for at least 30 minutes, thereby forming a PtNi nanoparticle solution;
isolating PtNi/substrate nanoparticles by:
sonicating the PtNi nanoparticle solution with substrate in chloroform solution, the chloroform solution causing PtNi nanoparticles to be uniformly loaded on the substrate,
subsequent to the sonicating, adding hexane to the sonicated chloroform solution, the hexane causing precipitation of PtNi/substrate nanoparticles within a time period of 5 minutes to 30 minutes, and
collecting the PtNi/substrate nanoparticles by filtration; and
acid leaching the PtNi/substrate.

13. The method of claim 12 wherein the acid leaching comprises:
sonicating the collected PtNi/substrate nanoparticles in water;
mixing an acid with the sonicated PtNi/substrate sonicated in water for 60 minutes; and
collecting the leached PtNi/substrate nanoparticles by filtration.

14. The method of claim 12, further comprising, after acid leaching, annealing the leached PtNi/substrate nanoparticles, forming a Pt-skin on the PtNi/substrate nanoparticles.

15. The method of claim 13, wherein the surfactant comprises oleic acid and oleylamine.

16. The method of claim 15, wherein the platinum precursor comprises Pt (II) acetylacetonate.

17. The method of claim 14, wherein the acid is $HClO_4$.

18. The method of claim 14, wherein the acid is 0.1 M $HClO_4$.

* * * * *